United States Patent
Moran et al.

(10) Patent No.: US 6,698,536 B2
(45) Date of Patent: Mar. 2, 2004

(54) ROLLER CONE DRILL BIT HAVING LUBRICATION CONTAMINATION DETECTOR AND LUBRICATION POSITIVE PRESSURE MAINTENANCE SYSTEM

(75) Inventors: David P. Moran, The Woodlands, TX (US); Gary R. Portwood, Kingwood, TX (US)

(73) Assignee: Smith International, Inc., Houston, TX (US)

( * ) Notice: Subject to any disclaimer, the term of this patent is extended or adjusted under 35 U.S.C. 154(b) by 0 days.

(21) Appl. No.: 10/079,919

(22) Filed: Feb. 20, 2002

(65) Prior Publication Data

US 2003/0062197 A1 Apr. 3, 2003

Related U.S. Application Data

(60) Provisional application No. 60/326,242, filed on Oct. 1, 2001.

(51) Int. Cl.[7] .............................................. E21B 10/24
(52) U.S. Cl. ........................ 175/57; 175/227; 175/337; 175/40
(58) Field of Search ................................ 175/227, 228, 175/39, 60, 57, 337

(56) References Cited

U.S. PATENT DOCUMENTS

| | | | |
|---|---|---|---|
| 3,604,523 A | 9/1971 | Lichte | 175/372 |
| 3,739,864 A | 6/1973 | Cason, Jr. et al. | 175/228 |
| 3,964,554 A | 6/1976 | Ricks et al. | 175/17 |
| 4,073,548 A | 2/1978 | Walters | 308/8.2 |
| 4,346,591 A | 8/1982 | Evans | 73/151 |
| 4,439,050 A | 3/1984 | Garner | 384/100 |
| 4,512,669 A | 4/1985 | Moore | 384/93 |
| 4,548,280 A | 10/1985 | Daly et al. | 175/40 |
| 4,597,455 A | 7/1986 | Walters et al. | 175/228 |
| 4,610,313 A | 9/1986 | Daly et al. | 175/40 |
| 4,629,338 A | 12/1986 | Ippolito | 384/94 |
| 4,684,946 A | 8/1987 | Issenmann | 340/855 |
| 4,688,647 A | 8/1987 | Daly et al. | 175/40 |
| 4,911,252 A | 3/1990 | Estes | 175/39 |
| 4,942,930 A | 7/1990 | Millsapps, Jr. | 175/228 |
| 4,981,182 A | 1/1991 | Dysart | 175/71 |
| 5,080,183 A | 1/1992 | Schumacher et al. | 175/371 |
| 5,189,932 A | 3/1993 | Palmo et al. | 76/108.2 |
| 5,435,170 A * | 7/1995 | Voelker et al. | 73/53.05 |
| 5,456,106 A | 10/1995 | Harvey et al. | 73/153 |
| 5,513,715 A | 5/1996 | Dysart | 175/371 |
| 5,813,480 A | 9/1998 | Zaleski, Jr. et al. | 175/40 |
| 6,021,377 A | 2/2000 | Dubinsky et al. | 702/9 |
| 6,230,822 B1 | 5/2001 | Sullivan et al. | 175/40 |
| 2003/0062200 A1 * | 4/2003 | Blackman | 175/228 |

FOREIGN PATENT DOCUMENTS

GB    2368360 A    5/2002    ........... E21B/12/02

\* cited by examiner

*Primary Examiner*—David Bagnell
*Assistant Examiner*—Jennifer Dougherty
(74) *Attorney, Agent, or Firm*—Rosenthal & Osha L.L.P.

(57) ABSTRACT

A roller cone drill bit is disclosed which includes at least one roller cone rotatably mounted to a bit body. The bit body includes therein a lubricant reservoir adapted to supply lubricant to bearings on which the roller cone rotates about the bit body. The bit includes a sensor adapted to detect drilling fluid contamination of the lubricant. The bit includes a processor/transmitter operatively coupled to the sensor and adapted to communicate signals corresponding to detected contamination.

20 Claims, 2 Drawing Sheets

ROLLER CONE DRILL BIT HAVING LUBRICATION CONTAMINATION DETECTOR AND LUBRICATION POSITIVE PRESSURE MAINTENANCE SYSTEM

CROSS-REFERENCE TO RELATED APPLICATIONS

This invention claims priority from U.S. Provisional Application Ser. No. 60/326,242 filed on Oct. 1, 2001.

STATEMENT REGARDING FEDERALLY SPONSORED RESEARCH OR DEVELOPMENT

Not applicable.

BACKGROUND OF THE INVENTION

1. Field of the Invention

The invention relates generally to the field of roller cone drill bits used to drill wellbores through earth formations. More particularly, the invention relates to systems and methods for determining possible failure of a bearing on a roller cone drill bit.

2. Background Art

Roller cone drill bits known in the art include one or more roller cones having cutting elements thereon rotatably mounted on a bearing journal pin. The bearing journal pin forms part of a bit body coupled to a drill string. A typical roller cone drill bit is shown in U.S. Pat. No. 5,189,932 issued to Palmo et al, for example.

Typically, the bearing surfaces of the journal pin are lubricated to reduce wear by rotation of the cone thereon by a lubricant that is stored in a reservoir formed in the bit body. FIG. 1 of the Palmo et al. '932 patent shows a cross section of one of the bearings and roller cones, including the lubricant reservoir. The lubricant reservoir is pressure compensated by a piston or the like so that the lubricant in the reservoir is maintained at substantially the same fluid pressure as the ambient pressure of a drilling fluid ("drilling mud") outside the bit body in the wellbore. Equalizing lubricant and wellbore fluid pressures reduces the tendency of the drilling fluid to bypass a seal disposed between the roller cone and the bearing journal pin. As is known in the art, entry of wellbore fluid into the lubricant reservoir or the bearing area of the journal pin can contaminate the lubricant to a degree as to make it useless as such. When the lubricant no longer can function, bearing failure typically follows rapidly afterward. Bearing failure is undesirable not merely because the bit will have to be replaced prematurely, but also because upon bearing failure, there is a substantial risk of failure of a cone locking mechanism. If the cone locking mechanism fails, the cone may fall off the bit, making for an expensive and time consuming operation to "fish" (find and remove) the cone from the wellbore. Accordingly, it is desirable to reduce the possibility of premature bearing failure and attendant cone lock failure.

One system known in the art for indicating possible loss of lubrication function or expected bearing failure in a roller cone bit is described, for example, in U.S. Pat. No. 5,813,480 issued to Zaleski et al. The system disclosed in the Zaleski et al. '480 patent includes a number of different types of sensors disposed at selected positions in and on the bit body, and a signal processing and recording system adapted to record measurements made by the various sensors, and/or transmit the measurements to a telemetry unit for ultimate transmission to the earth's surface for detection and interpretation. Sensor types disclosed in the '480 patent include various forms of temperature sensor and pressure sensor.

It is also desirable to have a sensor in a drill bit which can indicate changes in the character of the lubricant which may result in loss of lubrication function. It is also desirable to have a system in a drill bit which can maintain a selected positive differential pressure in a lubricant reservoir to reduce the likelihood of lubricant contamination by the drilling fluid.

SUMMARY OF THE INVENTION

One aspect of the invention is a roller cone drill bit which includes at least one roller cone rotatably mounted to a bit body. The bit body includes therein a lubricant reservoir adapted to supply lubricant to bearings on which the roller cone rotates about the bit body. The bit includes a sensor adapted to detect drilling fluid contamination of the lubricant. The bit includes a processor/transmitter operatively coupled to the sensor and adapted to communicate signals corresponding to detected contamination. In one embodiment, the transmitter is adapted to communicate signals to a measurement-while-drilling collar.

One particular embodiment includes a first pressure sensor adapted to measure fluid pressure in the reservoir, a second pressure sensor adapted to measure fluid pressure in a wellbore outside the bit, and a pressure compensator adapted to control the fluid pressure inside the reservoir. The pressure sensors and the pressure compensator are operatively coupled to the processor/transmitter. The processor/transmitter is adapted to operate the pressure compensator to maintain a selected pressure differential between the reservoir and the wellbore.

Another aspect of the invention is a roller cone drill bit including at least one roller cone rotatably mounted to a bit body. The bit body includes therein a lubricant reservoir adapted to supply lubricant to bearings on which the roller cone rotates about the bit body. The bit includes a processor, a first pressure sensor adapted to measure fluid pressure in the reservoir, a second pressure sensor adapted to measure fluid pressure in a wellbore outside the bit, and a pressure compensator adapted to control the fluid pressure inside the reservoir. The pressure sensors and the pressure compensator are operatively coupled to the processor, and the processor is adapted to operate the pressure compensator to maintain a selected pressure differential between the reservoir and the wellbore.

Other aspects and advantages of the invention will be apparent from the following description and the appended claims.

DETAILED DESCRIPTION

Figure 1:
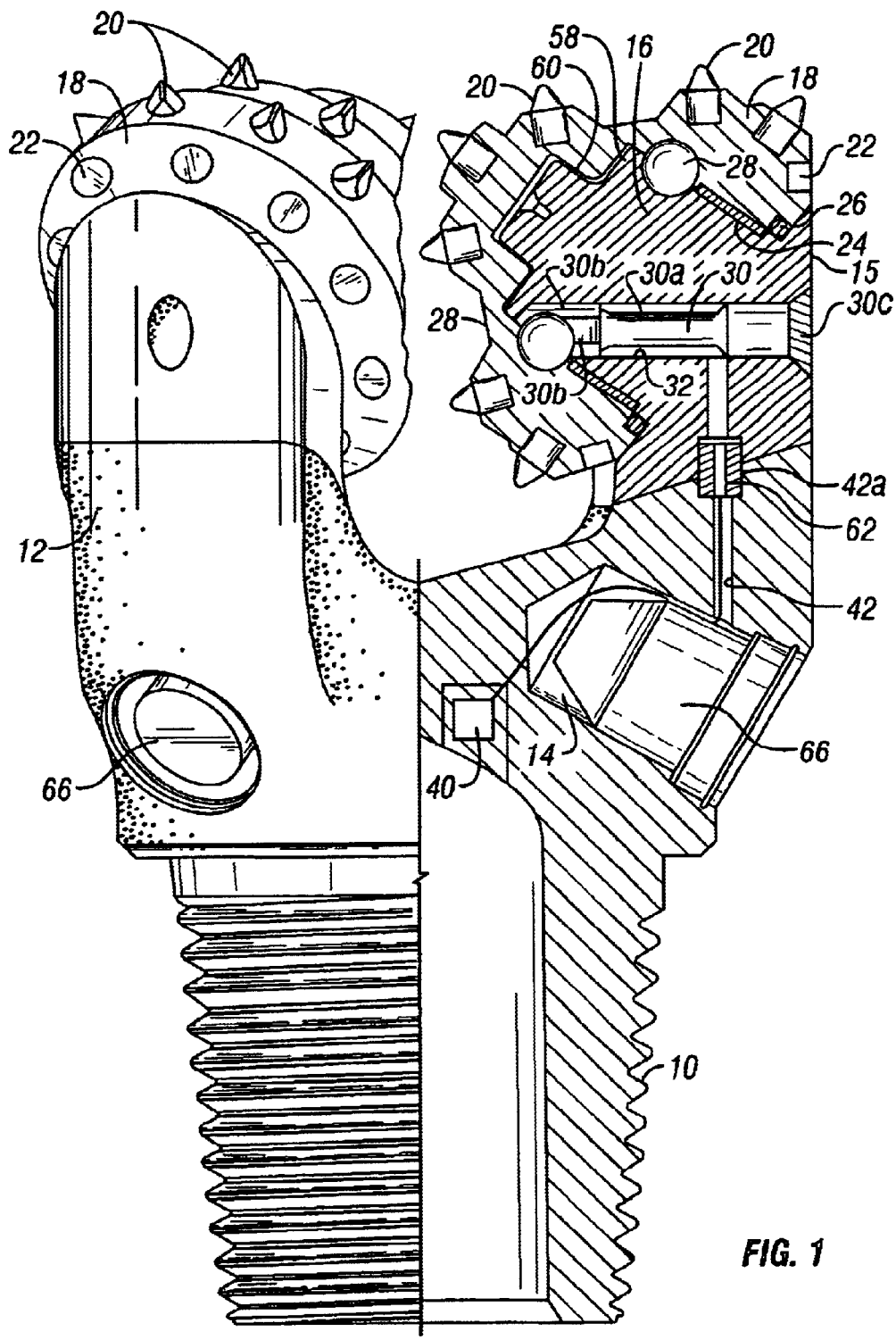
FIG. 1 shows a side view, including a cross-section of one journal, of a bit according to one embodiment of the invention.

One embodiment of a drill bit according to the invention is shown in side and cutaway view in FIG. 1. The drill bit includes a body having a coupling 10 adapted to join the drill bit to a drill string (not shown) or the like. Various types of couplings are well known in the art. Typically the drill bit will include three roller cones 18, each rotatably mounted to a leg 12 formed in the bit body. Each of the cones 18 is locked in place by locking balls 28 which ride in corresponding races formed in a journal 16 and formed inside the cone 18. The number of roller cones, and the type of cone locking device used on any of the cones as shown in FIG. 1 are only examples of such and are not intended to limit the scope of the invention. Other types of locking devices known in the art, including threaded split rings may be used in other embodiments of a bit according to the invention.

The roller cones 18 each include thereon cutting elements 20, 22 of various types, materials and configurations well known in the art. The number of, materials, type and configuration of such cutting elements 20, 22 are typically related to the formations expected to be drilled by the bit. The number of, type of, materials and configuration of such cutting elements 20, 22 as shown in FIG. 1 are only examples of such and are not intended to limit the scope of the invention.

The roller cones 18 rotate about bearing surfaces 24, 58, 60 made from any suitable journal bearing material known in the art. The bearing surfaces 24, 58, 60 are lubricated by a suitable lubricant of any type known in the art for use in roller cone drill bits. The lubricant is generally stored in a pressure compensated reservoir 14. The reservoir 14 includes a pressure compensator 66 which in one embodiment may be a biased, sealed piston of types well known in the art, or as will be explained in accordance with another aspect of the invention, may include a positive pressure differential maintenance system. The lubricant reservoir 14 is in hydraulic communication with the bearing surfaces 24, 58, 60 in this embodiment through a channel 42 drilled through the leg 12. The channel 42 is coupled to a ball loading passage 32 adapted to enable loading of the locking balls 28. The ball loading passage 32 is typically sealed by a weld-in plug 30 (including inner end 30*a*, center 30*b* and outer end 30*c*) or the like. Drilling fluid used in a wellbore (not shown) disposed outside the drill bit is excluded from the bearing area and the reservoir 14 by a seal 26 disposed between the leg 12 and the cone 18. Many types of seal are known in the art, and the particular seal used in any embodiment is not intended to limit the scope of the invention.

In this embodiment, the passage 42 includes therein a receptacle 42*a* wherein is disposed a sensor 62 that is sensitive to an amount of water or other drilling fluid contaminant entering and mixed with the lubricant. One such sensor may be a set of electrodes adapted to enable measurement of electrical conductance (or resistance) of the lubricant. More preferably, the sensor 62 comprises electrodes adapted to enable measurement of the capacitance of the lubricant. As will be appreciated by those skilled in the art, the conductance (resistance) of the lubricant may increase as relatively conductive water begins to contaminate it. Alternatively, water, having a relatively high dielectric constant as compared with typical hydrocarbon-based lubricants, will change the capacitance of the lubricant in a measurable way even when not forming a continuous phase. Another type of sensor that is responsive to water entry into the lubricant is a pH sensor.

The sensor 62 is electrically coupled to a processor/transmitter 40 disposed in a suitable receptacle formed in the bit body. The processor/transmitter 40 energizes the sensor 62 to enable making any one or more measurements related to the capacitance, resistance and/or pH of the lubricant, and transmits signals to a receiver unit (not shown) disposed in a drill string component such as a measurement-while-drilling ("MWD") collar (not shown) for recording and/or transmitting to the earth's surface via well known telemetry systems, which may include electromagnetic telemetry or mud pressure modulation telemetry. Such receiver/communications systems are well known in the art and are described, for example, in U.S. Pat. No. 5,448,227 issued to Orban, or in U.S. Pat. No. 6,057,784 issued to Schaaf et al. The processor/transmitter 40 may energize the sensor with alternating current and measure a phase shift therein to determine capacitance, for example, or alternatively may energize the sensor 40 with alternating or direct current and determine a voltage drop to measure resistance.

Figure 2:
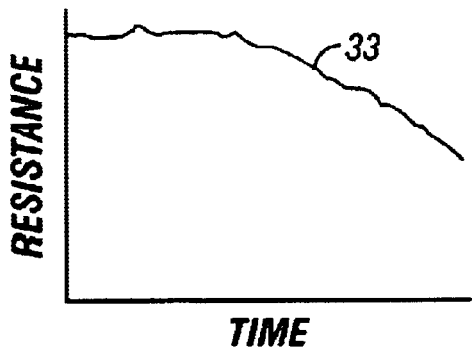
FIG. 2 shows an example graph of resistance of lubricant in the bit.
Figure 3:
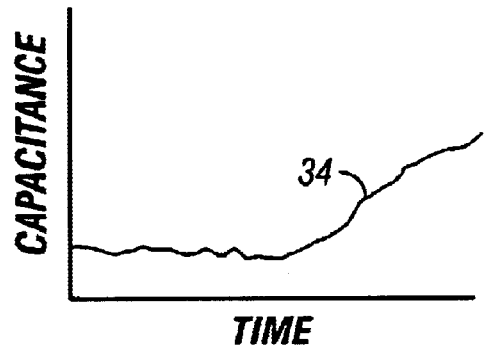
FIG. 3 shows an example graph of capacitance of lubricant in the bit.

Indications of lubricant contamination by drilling fluid may be obtained by measuring changes in the pH, the resistance, as shown at 33 in FIG. 2, or the capacitance, as shown at 34 in FIG. 3. If the lubricant is shown to be at least partially contaminated by drilling fluid, the wellbore operator may elect to "pull" (change) the drill bit prior to an expected bearing failure resulting from loss of lubricating function. Such indications may be obtained by decoding and interpreting, at the earth's surface, measurements sent from the bit via the telemetry in the MWD collar (not shown).

Another aspect of the invention relates to maintaining lubricant pressure at a selected pressure greater than fluid pressure in the wellbore. Maintaining a higher lubricant pressure in the reservoir (14 in FIG. 1) may reduce the possibility of drilling fluid bypassing the seal (26 in FIG. 1) thus contaminating the lubricant. One embodiment of a lubricant pressure maintenance system according to this aspect of the invention includes a first pressure sensor P1 adapted to measure pressure in the wellbore (drilling fluid pressure). A second pressure sensor P2 is adapted to measure pressure in the reservoir 14 or anywhere in the lubrication system inside the seal (26 in FIG. 1). The pressure sensors P1, P2 are operatively connected to the processor/transmitter 40, which determines a pressure differential between the lubrication system and the wellbore. The processor/transmitter 40 is operatively connected to the pressure compensator 66, which in this embodiment includes a motor 44 coupled through a worm drive or the like to a compensator piston 41. Movement of the piston 41 by the motor 44 is adapted to cause the pressure in the lubrication system to be maintained at a selected differential above the fluid pressure in the wellbore. The motor 44 may be sealed in a chamber in the reservoir 14 by a sealed diaphragm 43 or the like to avoid contamination thereof by drilling fluid. Some embodiments of a bit according to this aspect of the invention may only require use of a processor in substitution of the processor/transmitter 40 of FIG. 1, because the selected differential pressure may be maintained automatically without the need to communicate data to the earth's surface.

In another embodiment of a bit according to this aspect of the invention, the selected differential pressure maintained by the motor 44 and piston 41 in response to measurements of pressure made by the two pressure sensors P1, P2 may be adjusted during drilling of the wellbore by communicating a signal to the processor/transmitter 40, such as by interrupting flow of the drilling fluid according to a selected sequence. As is known in the art, such "downlink" communications to an MWD system may be used to cause the MWD system to change its programmed mode of operation. In an embodiment according to this aspect of the invention, the processor/transmitter 40 may also include signal reception capability in order to receive signals from the MWD system (not shown). Changing the differential pressure may be used, for example, to compensate for changes in the selected flow rate of the drilling fluid, for changes in ambient temperature, or changes in viscosity of the drilling fluid, for example. Alternatively, the controller/transmitter 40 may be programmed to automatically select a differential pressure that is related to the pressure of the drilling fluid outside the bit, as measured by sensor P1. As will be appreciated by those skilled in the art, a drilling fluid pressure in an annular space between the bit and the wall of the wellbore may be lower than the fluid pressure near the cones and seals (26 in FIG. 1). Prior art pressure compensation systems, which rely on a fixed-force biasing device such as a spring to drive the pressure compensation piston, may not provide enough pressure to the lubricant to avoid drilling fluid bypassing the seals (26 in FIG. 1), because the annulus pressure is lower than the pressure near the seals under high flow rate conditions. A bit according to this aspect of the invention may have the capacity to automatically adjust the differential pressure to suit the drilling conditions.

Figure 4:
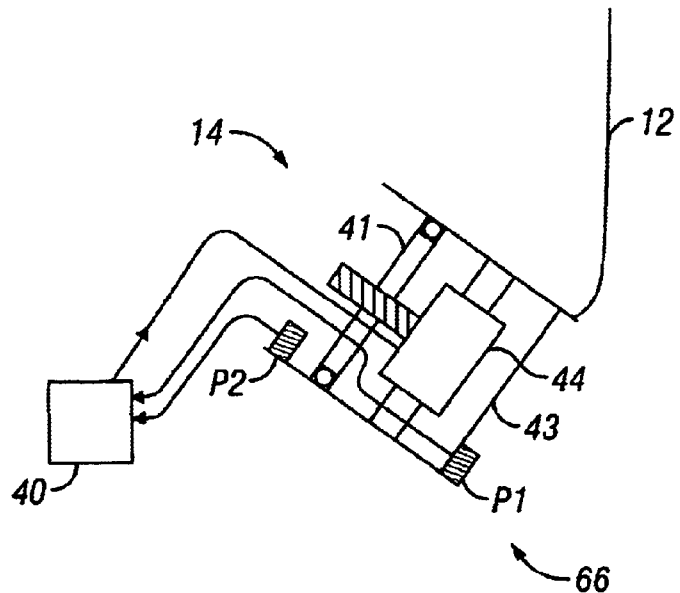
FIG. 4 shows an example of a lubricant pressure compensating system.

Another embodiment of a lubricant pressure maintenance system includes coupling both the sensor (62 in FIG. 1) and pressure sensors (P1 and P2 in FIG. 4) to the processor (40 in FIG. 1). Although the embodiment shown in FIG. 1 has the sensor 62 placed in the passage 42 near the pressure compensator 66, in some embodiments it may be preferable to position the sensor 62 proximate the seal 26 so that intrusion of drilling fluid past the seal 26 may be more promptly detected. In this embodiment of the invention, the processor 40 may be programmed to operate the motor 44 so that an increased differential pressure (as measured by pressure sensors P1, P2) is maintained when drilling fluid intrusion is detected.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A roller cone drill bit, comprising:
   at least one roller cone rotatably mounted to a bit body, the bit body including therein a lubricant reservoir adapted to supply lubricant to bearings on which the roller cone rotates about the bit body;
   a sensor disposed along a passage positioned between the lubricant reservoir and a ball loading passage of the roller cone, the sensor adapted to detect drilling fluid contamination of the lubricant; and
   a processor/transmitter operatively coupled to the sensor and adapted to communicate signals corresponding to detected contamination.

2. The bit as defined in claim 1 wherein the sensor comprises a capacitance sensor.

3. The bit as defined in claim 1 wherein the sensor comprises a resistance sensor.

4. The bit as defined in claim 1 wherein the sensor comprises a pH sensor.

5. The bit as defined in claim 1 wherein the processor/transmitter is adapted to transmit a signal to a receiver disposed in a measurement-while-drilling unit, the measurement-while-drilling unit adapted to communicate data from the processor/transmitter to the earth's surface.

6. A roller cone drill bit, comprising:
   at least one roller cone rotatably mounted to a bit body, the bit body including therein a lubricant reservoir adapted to supply lubricant to bearings on which the roller cone rotates about the bit body;
   a sensor adapted to detect drilling fluid contamination of the lubricant;
   a processor/transmitter operatively coupled to the sensor and adapted to communicate signals corresponding to detected contamination;
   a first pressure sensor adapted to measure fluid pressure in the reservoir, a second pressure sensor adapted to measure fluid pressure in a wellbore outside the bit, and a pressure compensator adapted to control the fluid pressure inside the reservoir, the pressure sensors and the pressure compensator operatively coupled to the processor/transmitter, the processor/transmitter adapted to operate the pressure compensator to maintain a selected pressure differential between the reservoir and the wellbore.

7. The bit as defined in claim 6 wherein the pressure compensator comprises a motor driven piston.

8. A roller cone drill bit, comprising:
   at least one roller cone rotatably mounted to a bit body, the bit body including therein a lubricant reservoir adapted to supply lubricant to bearings on which the roller cone rotates about the bit body;
   a processor; and
   a first pressure sensor adapted to measure fluid pressure in the reservoir, a second pressure sensor adapted to measure fluid pressure in a wellbore outside the bit, and a pressure compensator adapted to control the fluid pressure inside the reservoir, the pressure sensors and the pressure compensator operatively coupled to the processor, the processor adapted to operate the pressure compensator to maintain a selected pressure differential between the reservoir and the wellbore.

9. The bit as defined in claim 8 wherein the pressure compensator comprises a motor driven piston.

10. The bit as defined in claim 8 wherein the selected differential pressure is related to an external pressure of drilling fluid.

11. The bit as defined in claim 8 further comprising a signal receiver operatively coupled to the processor, the receiver adapted to detect instructions transmitted from the earth's surface, the processor adapted to change the selected differential pressure in response to the instructions.

12. The bit as defined in claim 8 further comprising a sensor disposed in a bearing lubrication system on the bit, the sensor adapted to detect intrusion of drilling fluid into the lubrication system, the sensor operatively coupled to the processor, the processor adapted to increase the differential pressure upon detection of drilling fluid intrusion.

13. The bit as defined in claim 12 wherein the intrusion sensor comprises a capacitance sensor.

14. A roller cone drill bit, comprising:
   at least one roller cone rotatably mounted to a bit body, the bit body including therein a lubricant reservoir adapted to supply lubricant to bearings on which the roller cone rotates about the bit body;
   a processor;
   a first pressure sensor adapted to measure fluid pressure in the reservoir, a second pressure sensor adapted to measure fluid pressure in a wellbore outside the bit, and a pressure compensator adapted to control the fluid pressure inside the reservoir, the pressure sensors and the pressure compensator operatively coupled to the processor, the processor adapted to operate the pressure compensator to maintain a selected pressure differential between the reservoir and the wellbore;
   a sensor disposed in a bearing lubrication system on the bit, the sensor adapted to detect intrusion of drilling fluid into the lubrication system, the sensor operatively coupled to the processor, the processor adapted to increase the differential pressure upon detection of drilling fluid intrusion, wherein the intrusion sensor comprises a resistance sensor.

15. A method for maintaining lubrication in a roller cone drill bit, comprising:

measuring a pressure in a lubricant in a lubricating system in the bit and a pressure in a drilling fluid outside the bit; and operating a pressure compensator in response to the pressure measurements to maintain a selected differential pressure between the lubricant and the drilling fluid.

16. The method as defined in claim 15 wherein the selected differential pressure is related to a flow rate of the drilling fluid.

17. The method as defined in claim 15 further comprising detecting intrusion of the drilling fluid into the lubricant, and increasing the differential pressure in response thereto.

18. The method as defined in claim 17 wherein the detecting comprises measuring a capacitance of the lubricant.

19. The method as defined in claim 17 wherein the detecting comprises measuring a resistance of the lubricant.

20. The method as defined in claim 17 wherein the detecting comprises measuring a pH of the lubricant.

* * * * *